(12) United States Patent
Zeng

(10) Patent No.: US 8,090,465 B2
(45) Date of Patent: Jan. 3, 2012

(54) FASHION DESIGN METHOD, SYSTEM AND APPARATUS

(76) Inventor: Belinda Luna Zeng, Cupertino, CA (US)

( * ) Notice: Subject to any disclaimer, the term of this patent is extended or adjusted under 35 U.S.C. 154(b) by 0 days.

(21) Appl. No.: 12/717,896

(22) Filed: Mar. 4, 2010

(65) Prior Publication Data

US 2011/0218664 A1   Sep. 8, 2011

(51) Int. Cl.
 *G06F 19/00* (2011.01)
(52) U.S. Cl. ........................................... 700/132
(58) Field of Classification Search .......... 700/130–133; 705/27.2
 See application file for complete search history.

(56) References Cited

U.S. PATENT DOCUMENTS

| | | | | |
|---|---|---|---|---|
| 5,680,528 | A * | 10/1997 | Korszun | 345/630 |
| 5,930,769 | A * | 7/1999 | Rose | 705/26.81 |
| 6,310,627 | B1 * | 10/2001 | Sakaguchi | 345/630 |
| 6,404,426 | B1 * | 6/2002 | Weaver | 345/419 |
| 6,516,240 | B2 * | 2/2003 | Ramsey et al. | 700/131 |
| 6,546,309 | B1 * | 4/2003 | Gazzuolo | 700/132 |
| 6,665,577 | B2 * | 12/2003 | Onyshkevych et al. | 700/130 |
| 6,711,455 | B1 * | 3/2004 | Holloway et al. | 700/132 |
| 7,020,538 | B2 * | 3/2006 | Luhnow | 700/132 |
| 7,079,134 | B2 * | 7/2006 | Kung et al. | 345/420 |
| 7,242,999 | B2 * | 7/2007 | Wang | 700/132 |
| 2001/0026272 | A1 * | 10/2001 | Feld et al. | 345/419 |
| 2002/0004763 | A1 * | 1/2002 | Lam | 705/26 |
| 2002/0188372 | A1 * | 12/2002 | Lane et al. | 700/130 |
| 2003/0011590 | A1 * | 1/2003 | Kung et al. | 345/419 |
| 2004/0049309 | A1 * | 3/2004 | Gardner et al. | 700/132 |
| 2004/0078285 | A1 * | 4/2004 | Bijvoet | 705/26 |
| 2004/0083142 | A1 * | 4/2004 | Kozzinn | 705/27 |
| 2006/0015208 | A1 * | 1/2006 | Reyes Moreno | 700/132 |
| 2006/0287877 | A1 * | 12/2006 | Wannier et al. | 705/1 |
| 2009/0222127 | A1 * | 9/2009 | Lind | 700/132 |

* cited by examiner

*Primary Examiner* — Nathan Durham
(74) *Attorney, Agent, or Firm* — Marin Ciona, Esq.

(57) ABSTRACT

A computerized method for the design and selection of cloths and fashion accessories and comprising the following steps: taking measurements of body parts of a person with the aid of a measuring tool displayed on a computer's screen; loading the biometric data of the person, comprising those measurements, in the computer; analyzing that biometric data; selecting a model from a library stored in a computer; overlaying an image of the model on an image of the person; comparing the body shape of the model with the body shape of the person as depicted in the two overlaid images; and changing the model in order to achieve a personalized model by performing pushing and pulling operations on the active locations of the model until it fits the body shape of the person.

18 Claims, 5 Drawing Sheets

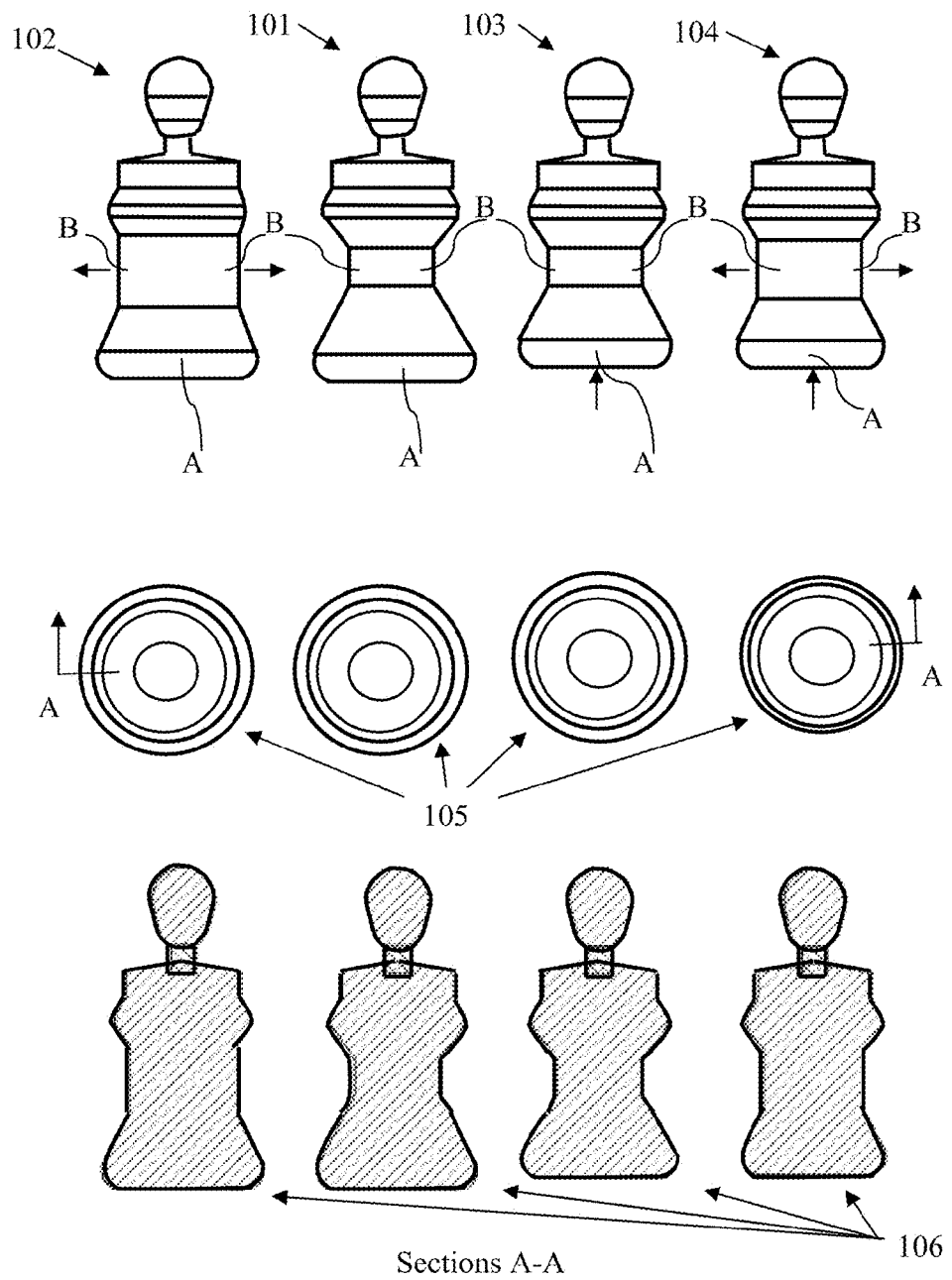
FIG. 1 - a

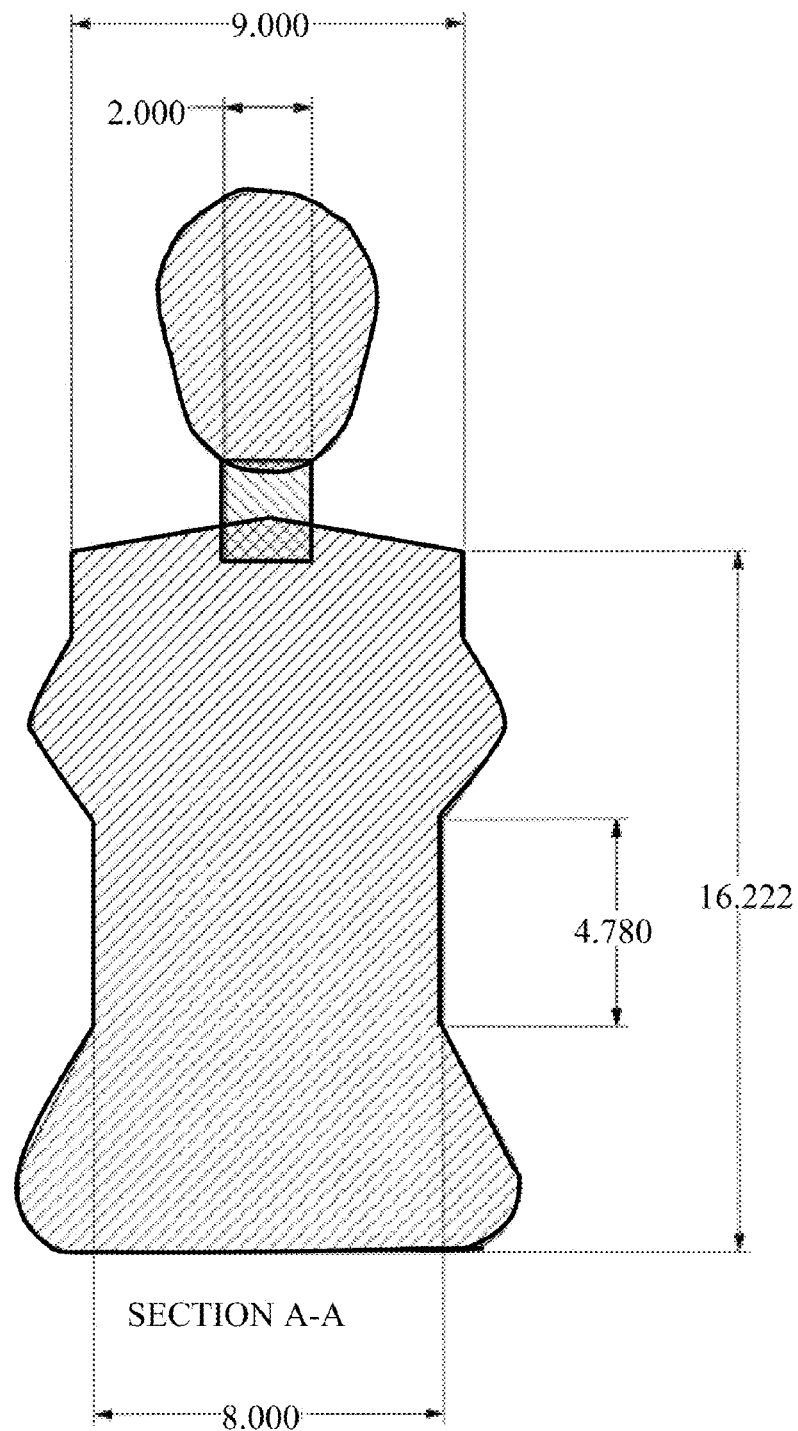
FIG. 1 - b

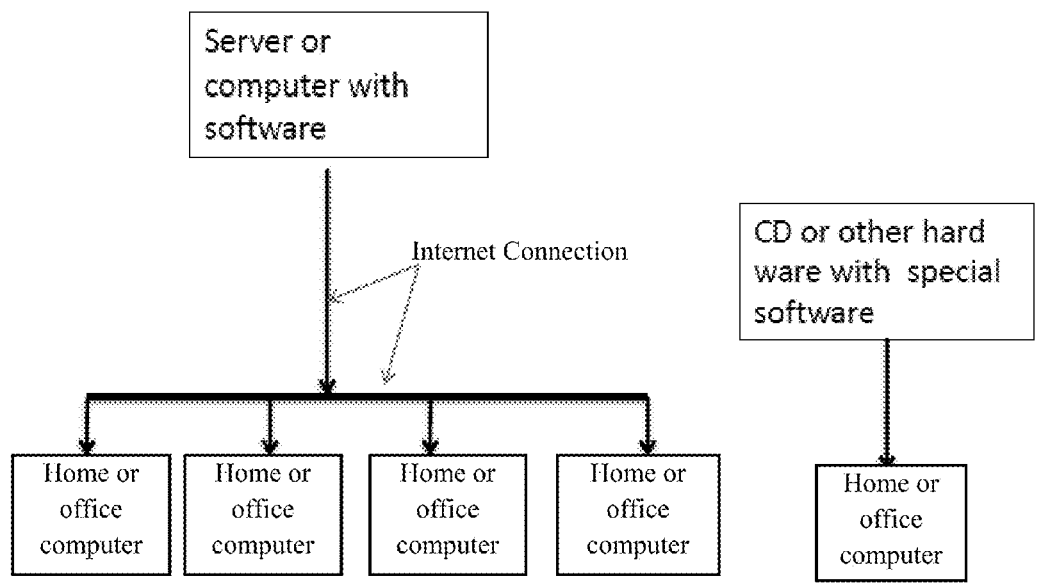
FIG. 1 - c
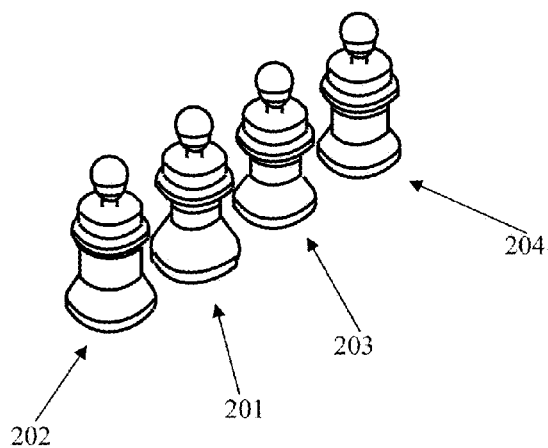
FIG. 2

FASHION DESIGN METHOD, SYSTEM AND APPARATUS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates generally to the fashion industry and particularly to the computerized design and/or selection of clothing and fashion accessories.

2. Description of the Related Art

Currently, there are online websites offering free fashion templates, design tutorials, tips, free fashion templates and fashion galleries. There are also web stores designed to help bring guidance to individuals who wanted to start their own fashion lines. These web stores and websites and other existing resources help a diverse group of people from all over the world go after their fashion dreams.

For instance, U.S. Pat. No. 7,617,016 discloses a computer implemented method that presents garments to a consumer using a computer by reading a database of garments, wherein the database of garments includes parameters for at least some of the garments represented by records in the database of garments, the parameters including at least a garment type, reading data representing a plurality of garment types, the data including, for each type of the plurality of garment types, a set of tolerance ranges for that garment type, obtaining consumer measurements from the consumer or a source derived from the consumer, obtaining garment measurements for garments in the database of garments, comparing customer measurements to garment measurements, scoring garments from the database of garments based on garment measurements, customer measurements and the set of tolerance ranges for each garment based on its garment type, and presenting the consumer with a computer generated filtered listed of garments from the database of garments ordered, at least approximately, according to garment scores.

U.S. patent application Ser. No. 20020188372 teaches a method and system for computer aided garment selection on dummy models. One or more fitting points and corresponding measurements of the garment relevant for examining the fitting condition of the garment on the virtual model are identified first. One or more fitting preferences for the garment are also indicated. Poor fit locations on the virtual model are then highlighted after examining the person's fitting preferences against the measurements of the fitting points. The person can use the virtual model for examining whether the garment fits well in order to make a purchase decision in an interactive remote shopping session.

U.S. Pat. No. 5,930,769 provides a method of manual fashion shopping and method for electronic fashion shopping by a customer using a programmed computer, CD-ROM, television, Internet or other electronic medium such as video. The method comprises receiving personal information from the customer; selecting a body type and fashion category based on the personal information; selecting fashions from a plurality of clothes items based on the body type and fashion category; outputting a plurality of fashion data based on the selected fashions; and receiving selection information from the customer.

U.S. Pat. No. 6,907,310, entitled Production and visualization of garments, provides methods and systems for modeling and modifying garments, providing a basis for integrated "virtual tailoring" systems and processes. The garment models provided relate specific design points of the garment to specific body regions in terms of explicit 3D relationship rules, enabling garments to be modified holistically, by a constrained 3D warp process, to fit different body shapes/sizes, either in order to generate a range of graded sizes or made-to-measure garments, for the purposes of visualization and/or garment production. The methods described further facilitate the generation of 2D pattern pieces by flattening 3D representations of modified garments using a constrained internal energy minimization process, in a manner that ensures that the resulting pattern pieces can be assembled in substantially the same way as those of the base garment. The methods enable the visualization and/or production of bespoke or graded garments, and garment design modifications, within an integrated virtual tailoring environment.

U.S. Pat. No. 6,882,897, entitled Reconfigurable garment definition and production method, discloses computer-aided design and manufacture software and hardware for automate garment and fashion definition and production. Configurable garment includes ornamental element, pattern display, and personal identifier and wireless sensor electronics.

United States Patent Application 20020103714, entitled System for processing customizable product orders over a computer network, discloses a system for ordering and producing customizable limited edition garments. A server computer executing a web page server process is coupled to a design database that stores production data related to one or more garments available for selection by a customer. The server computer is coupled to a client computer over a computer network. The client computer executes a web browser process that displays a graphical user interface screen provided by the server computer. The graphical user interface displays the one or more garments available for selection by the user and receives user input regarding ordering information and product customization information. An automated production system is coupled to the first computer and is configured to manufacture a garment selected by the user in response to user selection data and in accordance with production data for the selected garment stored in the design database.

U.S. patent application Ser. No. 20040083142, entitled System and method for fitting clothing, teaches a method for fitting clothing based on the body dimensions of an individual. The method comprising the steps of (a) Establishing standard body dimensions and ratios for a given garment style. (b) Choosing a try-on size and style that comes closest to an individual's preferences (c) obtaining information from the individual with regard to the personal style and fit preferences of the individual; (d) scanning the individual to establish his or her body dimensions and ratios; and (e) creating alterations to the pattern of the chosen try-on size and style based on a comparison of the individual's body dimensions and ratios to the standard body dimensions and ratios for that style and incorporating the information regarding the individuals personal style and fit preferences.

None of the above, however, provides a solution for the online creation and/or selection of clothing or fashion accessories using a personalized 3D model, personalized 2D design drawing and 3D physical model dimension data converter, a push and pull technique for the creation of the personalized 3D model for fit and esthetic study, or use of the personalized 3D physical model for final dimensional verifications.

BRIEF SUMMARY OF THE INVENTION

The present invention provides methods, systems and apparatuses for computerized design and/or selection of clothes, fashion accessories, and/or similar items. More particularly, the present invention offers methods, systems and apparatuses that can be used for clothes and fashion design at one's home or office by individual designer who may be a professional or non-professional. In an embodiment, the present invention creates personalized 3D virtual human models of the users or other persons and converts the data into 2D design drawings or transfers the data to a machine capable of building a 3D physical model for fit and esthetic analysis.

A push and pull technique is used to create a personalized model from a library model, which can then be used for an analysis as to how a certain clothing for example will look on a particular person. The push and pull technique may also be used to personalize 2D design templates and/or drawings which may be preloaded into the computer library or added by the user by drawing them directly on the computer using a CAD software for example, or added by other ways as for example drawing on paper and scanning the drawing into the computer. In addition, final verifications are achieved by a inputting into a special purpose computer a combination of person's actual measurements, fit tolerance, and/or fit preference. One of the goals of the present invention is to bridge the gap between designers, who may be professionals or not, and manufacturers. The present invention makes clothing and fashion accessories design and/or selection look so realistic that everyone that sees them can easily picture how the clothing and/or the fashion accessories will look like on a particular person when it is made. A user can use the teachings of the present invention to design and/or select clothing like, for example, dresses, skirts, shirts, bras, pants, coats, lingerie, T-shirt, sweater, pullover, suit, socks, hat, cap or gloves, to design shoes, or, to design and/or select fashion accessories like, for example, jewelry, eyeglasses, purses or hand bags.

BRIEF DESCRIPTION OF THE DRAWINGS

For exemplification purposes, and not for limitation purposes, embodiments of the invention are illustrated in the figures of the accompanying drawings, in which:

FIG. 1-a illustrates the front view of four pawn-shape items 101, 102, 103, 104, and their respective top views 105, and sectional views 106, in accordance with several embodiments of the present invention.

FIG. 1-b illustrates the sectional view of a pawn-shape item from FIG. 1, with dimensions, in accordance with an embodiment of the present invention.

FIG. 1-c illustrates the diagram of a sample computer network and an isolated computer, which can be used to practice the present invention.

FIG. 2 illustrates the perspective view of the pawn-shape items from FIG. 1-a, in accordance with several embodiments of the present invention.

DETAILED DESCRIPTION OF THE INVENTION

Figure 3:
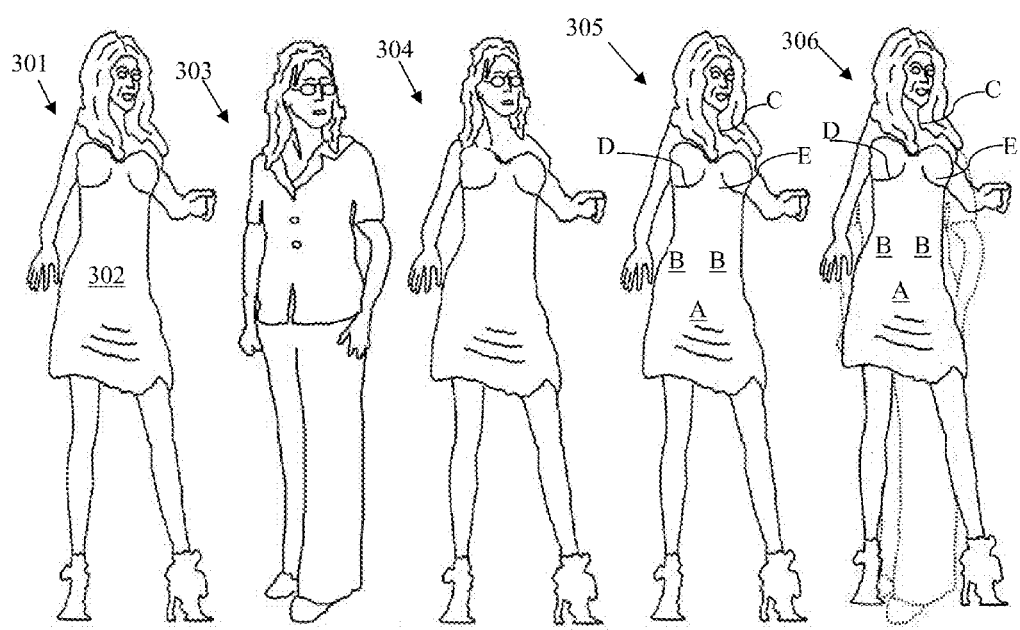
FIG. 3 shows the image of: a model 301 wearing a dress 302, a person 303 interested in having a clothing item or a fashion accessory designed for herself, a partially personalized model 304, a modifiable model 305, and a combination 306 created by overlaying the image of the modifiable model 305 on the image of the person 303, in accordance with several embodiments of the present invention.

What follows is a detailed description of specific embodiments of the invention in which the invention may be practiced. Reference will be made to the attached drawings, and the information included in the drawings is part of this detailed description. The specific embodiments of the invention, which will be described herein, are presented for exemplification purposes, and not for limitation purposes. It should be understood that structural and/or logical modifications could be made by someone of ordinary skills in the art without departing from the scope of the present invention. Therefore, the scope of the present invention is defined only by the accompanying claims and their equivalents.

FIG. 1-a illustrates the front view of four pawn-shape items (hereinafter "shape") 101, 102, 103, 104, and their respective top views 105, and sectional views 106, in accordance with several embodiments of the present invention. It is to be understood that the pawn-shape items are used here only for the purpose of simplifying the illustration of several aspects of the present invention. They can have the shape of a person, which is the preferred emphasis of the present invention, or, as someone of ordinary skills in the art would recognize, they could also have the shape of a pet, as for example, a dog.

As illustrated in FIG. 1-c, the present invention may be practiced by using one or more computers or servers (hereinafter "computer"), which are so designed and programmed as to perform the functions pertaining to the present invention and described hereafter. It is to be understood that the term computer is to be understood very broadly, to include, for example, PCs, smart phones, or other similar devices. The computer may be a general purpose computer in which special software, so written as to enable the general purpose computer to perform the functions pertaining to the present invention, is installed. The computer may be independent and isolated from other computers, being capable of performing all or part of the said functions without the need of being linked to another computer. For example, the special software, which was initially copied on, for example, a compact disk, may be installed on a general purpose computer, as for example, a PC for home use. That computer may now be capable of performing all or part of the said functions, and therefore, its user may practice the present invention.

The computer can also be set, configured, and/or programmed to work in a network environment, as for example, online, via the Internet, or, in a Local Area Network. For example, the special software could be installed on one or more servers which may be accessible through the Internet by a user of a general purpose computer, or any other similar device, capable of connecting to the Internet. Hence, such a user could now practice the invention on his general purpose computer or device.

The shape 101 is an example of the shapes which may be preloaded into the library of a computer, and which, someone who desires to design and/or select (hereinafter "user"), a clothing item for example, may choose to start with. The shape 101 is preferably a tri-dimensional (hereinafter "3D") shape.

The shape 101 may be divided into separate sections, which are, independently of each other, modifiable. By pushing or pulling on certain active locations of a particular section, the appearance and the dimensions of the respective section can be modified by the user. The said active locations are preferably points, but they can be areas as well. Under the push or pull command from the user, sent for example by a combination of pressing, holding, and dragging a computer mouse, the computer may be programmed to modify the section by keeping the aspect ratios of the respective section, or, by ignoring the aspect ratio. For example, shape 102 was obtained by pulling on the active locations B of the library shape 101. Similarly, shape 103 was obtained by pushing on the active location A of the library shape 101. Furthermore, shape 104 was obtained by combining a pull action on the active location B with a push action on the active location A of the library shape 101.

One of ordinary skills in the art would recognize that a section can have a multitude of active locations. For example, all the points on the outside area of the section could be active locations for the purpose of pushing and pulling. Therefore, the user can have full control over the final appearance and dimensions of a computer suggested or given library shape or a library shape chosen by the user.

This method of transformation of a shape is almost entirely visual, which makes it easier to use by any user, including a non-professional. Once the shape looks like the user wanted, the data embedded in the new shape can be converted by the computer into several output forms which may be exploited by the user. For example, the data could be converted into two-dimensional (hereinafter "2D") drawings, like the one in FIG. 1-*b* for example, which may be used by the user, for example, to cut the fabric for an item of clothing he/she wishes to create. Or, the data could be converted to table with dimensions, which again, the user, or a machine, may use, for example, to cut the fabric for an item of clothing he/she wishes to create. Furthermore, the data could be converted and/or transferred to a machine capable of using the data to build a 3D physical shape, as shown in FIG. 2.

The push and pull technique may also be used to personalize 2D design templates and/or drawings which may be preloaded into the computer library or added by the user by drawing them directly on the computer, using a CAD software for example, or added by other ways as for example by drawing on paper and scanning the drawing into the computer.

FIG. 3 shows the image of: a model 301 wearing a dress 302, a person 303 interested in having a clothing item or a fashion accessory designed and/or selected for herself, a partially personalized model 304, a modifiable model 305, and a combination 306 created by overlaying the image of the modifiable model 305 on the image of the person 303, in accordance with several embodiments of the present invention. The model 301 is an example of models, which may be preloaded into the library of the computer for the user to choose from and use, for example, for designing and/or selecting a clothing item and/or a fashion accessory for herself or himself. The model 301 may be "suggested" by the computer after the user inputs the height and weight, or other similar and pertinent data, of the person for whom the design is intended, into the computer. The computer may suggest a single model or several models for the user to choose. The library models can be dressed or undressed. The dress is an example of clothing items and/or fashion accessories, which may also be preloaded into the library of the computer for the user to choose from and use, for example, for designing and/or selecting clothing and/or a fashion accessory item for herself or himself.

Clothing or clothing items should be understood as very broad terms encompassing everything that is worn for the purpose of covering the body. Examples of clothing are: dresses, skirts, shirts, bras, pants, coats, lingerie, T-shirt, sweater, pullover, suit, socks, hat, cap, gloves. The term clothing encompasses shoes. The term fashion accessory should be understood broadly to encompass everything that is carried rather than worn. Examples of fashion accessories are jewelry, eyeglasses, purses and hand bags. The clothing can be worn and the fashion accessories carried by a person or by something else, as for example a pet or a doll.

Other things, which may be useful to the user, may be preloaded in the computer library. For example, the computer library may contain shoulder or bra padding, fabrics, and/or any other materials and/or tools the user may need to design a clothing item or a fashion accessory.

The library model 301 may be partially or fully modified and/or personalized. For example, the library model 301 may be partially personalized 304 by replacing her head with the head of the person 303. The person 303 may be the user who wishes to design and/or select the dress 302, or another clothing or fashion accessory item, for herself, or, for example, a client of the user. The shape of the library model 301 may be partially (e.g., top-half of the body) modifiable 305, and therefore further personalized, by pulling or pushing on the active locations, for example, A, B, C, D and E. By pulling or pushing on the active locations, which may work as explained earlier, the user may adjust the shape of the library model 301 to fit the shape of the person 303 for the purpose of analyzing how the dress 302 would actually look like on the person 303. In the example shown 306, points A and C need to be pulled down, point B needs to be pulled out and points D and E need to be pushed in. The points D and E on the library model 305, for bra design purposes, may have three or even six degrees of freedom for the user to push or pull or move to obtain the best outlook she desires.

One of ordinary skills in the art would recognize that the number and/or position of the active locations or points, and their degree of freedom, may be changed as necessary for achieving the desired design result. Furthermore, one of ordinary skills in the art would recognize that only certain sections of the library model 305 could be modifiable (e.g., breast section, waist section, half-body) or the entire (i.e., full-body) shape of the library model 305 could be adjusted and/or modified.

Once the user finalizes the modification and personalization of the library model 306 and is happy with how the dress looks like, the user can save the new design and use it for later designs or offer it to others to use. The user may also have the option of trying, for example, by dragging from the library, on the newly personalized 3D virtual model, several other dresses which may differ in terms of, for example, style, fabric or color. In addition, the user could enhance the appearance of the personalized model by further modifying specific areas of the body, like shoulders and breasts, and using, for example, corresponding padding in the designed and/or selected cloths to make the person look better in the respective cloths. The data embedded in the newly achieved personalized 3D virtual model and/or design, of a dress in this example, may be now converted into 2D drawings or table data to be used by humans and/or machines, for cutting the fabric for example, or, the embedded data could be transferred to a machine which could use the data to build a 3D physical model.

In the example just described, for exemplification purposes only, the emphasis was on the design of a dress by using the teachings of the present invention. One of ordinary skills in the art would recognize that the same teachings can be used for the design and/or fit or esthetic analysis of any clothing, as for example a bra, and any fashion accessory, as for example a forearm bag, or any other similar items.

It should be understood that the image of the library model 301 and that of the person 303 may be inputted into the computer and/or created by any means available to the user and which may achieve the desired results. For example, a digital camera may be used to take a picture of the model 301 and a picture of the person 303 and each picture may be then uploaded into the computer. One of ordinary skills in the art would recognize that in order to create a library of models, clothing items, fashion accessories, and/or any other desired or necessary items, the inputting process (e.g., creating the models on the computer using special software, taking pictures and uploading them into the computer, etc) may need to be repeated.

Figure 4:
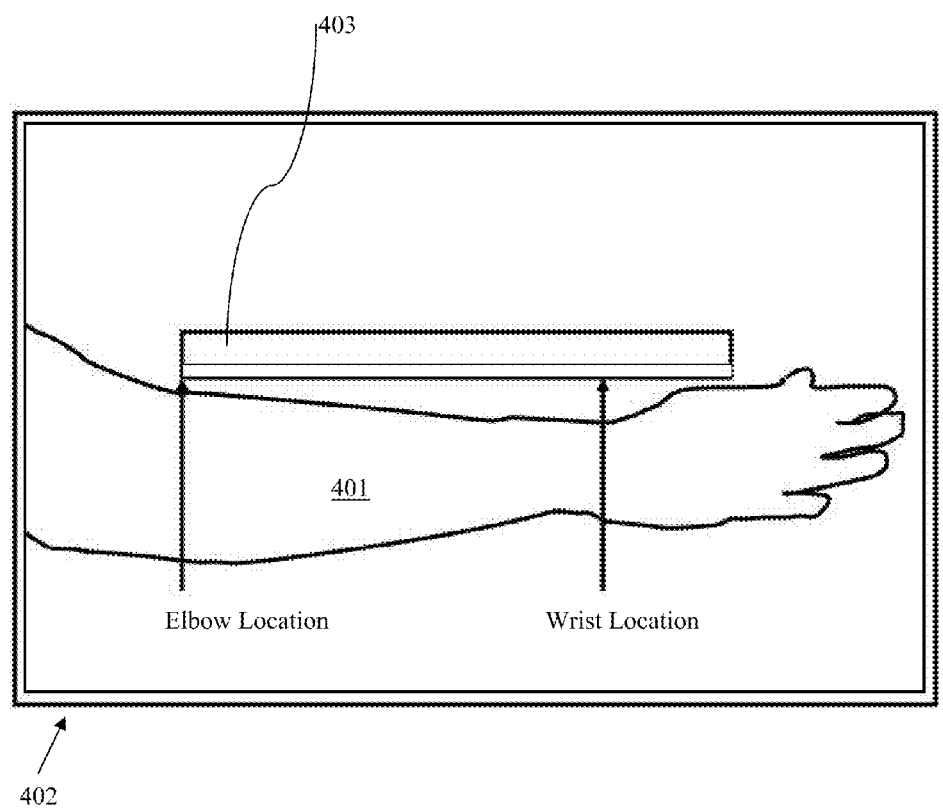
FIG. 4 shows the image of person's forearm 401 lying against a computer screen 402, which displays a ruler 403, in accordance with several embodiments of the present invention.

FIG. 4 shows the image of person's forearm 401 lying against a computer screen 402, which displays a ruler 403, in accordance with several embodiments of the present invention. The forearm 401 is preferably the forearm of the person for whom the design is intended. The distance from the elbow to the wrist, for example, could be measured and inputted into the computer by the user. The computer may be equipped with special software capable of analyzing and interpreting the received data. For example, the computer may "realize" that the person is a person with short forearms, and based on previously inputted human body biometric statistical data, automatically select and/or suggest one or more library models and/or adjust the library model and/or the personalized model to better mirror the actual person. This process can be used before or after the push and pull modifications performed by the user as explained earlier. This process may be used as an additional dimensional verification tool to ensure that the final design truly fits and looks good on the actual person.

Furthermore, the computer may be configured and/or programmed to compare the biometrical data of the actual person's body or parts of the body, with the dimensional data of a clothing and/or fashion accessory item, which is virtually tried on the personalized model, for the purpose of identifying interference spots and/or suggest changes. This particular step may be of particular importance in the designing and/or selection of, for example, shoes. Interference spots between the shoe and the actual person's foot, because of, for example, a particular shape of the person's foot, may be spotted and alterations to the shoe design may be made.

One of ordinary skills in the art would recognize that the measurement of actual body part of the person can be achieved by other means as well. For example, the computer could be equipped with a camera which may take a picture of the person's forearm, for example, and a device using, for example, a laser beam and capable of measuring the distance between the person's forearm and the computer. Using this data, the computer could then calculate the dimensions of the person's forearm. The computer could also measure other body parts or sections of the person's body, as for example the head or the upper-body section.

It is to be understood that the other biometric data of the actual person may be inputted by the user into the computer. For example the height and weight of the actual person may be used. The data about the actual person, which the computer will have, including data about the age of the person for example, may be used by the computer to select and/or "suggest" one or more library models and/or to perform biometric verifications and analysis for the purpose of, for example, adjusting the library model or the personalized model to better mirror the appearance of the actual person. The data may also be used by the computer to "suggest" designs, 2D drawings, color scheme, fabric, fashion accessories, etc.

The final design may be adjusted by the computer by factoring in the fit tolerance (e.g., 0.25 inches) inputted by the user into the computer. In addition the final design may be adjusted by the computer based on the fit preference (e.g., loose, tight, etc) of the actual person and which is inputted into the computer by the user.

Although specific embodiments have been illustrated and described herein for the purpose of disclosing the preferred embodiments, someone of ordinary skills in the art will easily detect alternate embodiments and/or equivalent variations, which may be capable of achieving the same results, and which may be substituted for the specific embodiments illustrated and described herein without departing from the scope of the present invention. Therefore, the scope of this application is intended to cover alternate embodiments and/or equivalent variations of the specific embodiments illustrated and/or described herein. Hence, the scope of the present invention is defined only by the accompanying claims and their equivalents.

What is claimed is:

1. A computerized method for the design and selection of cloths and fashion accessories and comprising, in any order, the following steps:
   taking measurements of at least one body part of a person with the aid of a measuring tool displayed on a computer's screen;
   loading biometric data of the person, comprising said measurements, in the computer;
   analyzing said biometric data;
   selecting a model from a library stored in the computer;
   overlaying an image of said model on an image of the person;
   comparing the body shape of said model with the body shape of the person as depicted in the two overlaid images; and
   changing said model in order to achieve a personalized model by performing pushing and pulling operations on the active locations of said model until it fits the body shape of said person.

2. A computerized method as in claim 1, wherein said loading is performed by the user of said computer by inputting said biometric data in said computer and wherein said biometric data belongs to a real person.

3. A computerized method as in claim 1, wherein said biometric data comprises the height and the weight of a real person.

4. A computerized method as in claim 1, wherein said biometric data comprises a picture of a real person.

5. A computerized method as in claim 1, wherein said selecting is done by said computer.

6. A computerized method as in claim 1, wherein said model is a 3D model.

7. A computerized method as in claim 1, wherein said model is a 2D design template.

8. A computerized method as in claim 1, wherein said changing is further performed by virtually replacing portions of said model with corresponding portions of a real person's body.

9. A computerized method as in claim 1, further comprising converting the data embedded into said personalized model into 2D drawings.

10. A computerized method as in claim 1, further comprising converting the data embedded into said personalized model into table with dimensional data.

11. A computerized method as in claim 1, further comprising transferring the data embedded into said personalized model to a machine capable of using the data for building physical models of said personalized model.

12. A computerized method as in claim 1, further comprising transferring the data embedded into said personalized model to a machine capable of cutting fabric.

13. A computerized method as in claim 1, further comprising enhancing specific areas of said personalized model.

14. A computerized method as in claim 1, further comprising selecting from said library clothing items and testing their appearance and fit on said personalized model.

15. A computerized method as in claim 14, further comprising comparing said personalized model dimensions with said clothing items dimensions for the purpose of finding interference spots.

16. A computerized method as in claim 1, further comprising selecting from said library fashion accessories and testing their appearance on said personalized model.

17. A system for the design and selection of cloths and fashion accessories, comprising:
a computer which performs the steps of taking measurements of at least one body part of a person with the aid of a measuring tool displayed on said computer's screen, loading biometric data of the person, comprising said measurements, in said computer, analyzing the said biometric data, selecting a model from a library stored in said computer, overlaying an image of said model on an image of the person, comparing the body shape of said model with the body shape of the person as depicted in the two overlaid images, changing the said model in order to achieve a personalized model by performing pushing and pulling operations on the active locations of said model until it fits the body shape of said person; and
an output device for the data embedded in said personalized model.

18. A system as in claim 17, wherein the said output device is a machine capable of using the data for building physical models of said personalized model.

* * * * *